United States Patent
Szatko

(10) Patent No.: US 6,257,342 B1
(45) Date of Patent: Jul. 10, 2001

(54) SOIL GRADING APPARATUS

(76) Inventor: Dennis J. Szatko, P.O. Box 182, Clarks, NE (US) 68628

( * ) Notice: Subject to any disclaimer, the term of this patent is extended or adjusted under 35 U.S.C. 154(b) by 0 days.

(21) Appl. No.: 09/498,672

(22) Filed: Feb. 7, 2000

(51) Int. Cl.⁷ .................................................. A01B 45/00
(52) U.S. Cl. ............................ 172/21; 172/540; 172/157
(58) Field of Search ............................... 172/21, 22, 155, 172/156, 157, 174, 179, 180, 518, 540, 543, 684.5, 175

(56) References Cited

U.S. PATENT DOCUMENTS

| | | | | |
|---|---|---|---|---|
| 594,892 | * | 12/1897 | Newton | 172/436 |
| 1,354,495 | * | 10/1920 | Larsen | 172/423 |
| 1,627,422 | * | 5/1927 | Wike | 172/21 |
| 2,966,218 | * | 12/1960 | Johnson et al. | 172/172 |
| 3,062,300 | * | 11/1962 | Bullard | 172/21 |
| 4,155,315 | * | 5/1979 | Dobbins | 111/8 |
| 4,192,387 | * | 3/1980 | Stinson | 172/21 |
| 4,603,544 | * | 8/1986 | Hayhurst | 172/554 X |
| 4,899,828 | * | 2/1990 | Harris | 172/21 |

* cited by examiner

Primary Examiner—Victor Batson
(74) Attorney, Agent, or Firm—Zarley, McKee, Thomte, Voorhees & Sease; Dennis L. Thomte

(57) ABSTRACT

A soil grader is disclosed which is mounted on the forward end of a skid-steer vehicle or to the three-point hitch of a tractor. The soil grader includes first and second side frames having a forwardly extending support secured thereto which enables the grader to be secured to the vehicle or tractor. A cross frame is secured to the first and second side frames and has a plurality of horizontally spaced-apart, elongated, rigid teeth secured thereto which extend downwardly and forwardly therefrom for engagement with the soil being graded. A horizontally disposed soil roller is rotatably secured to the first and second side frames adjacent the lower end thereof rearwardly of the teeth. Spring tooth supports are secured to the first and second frame members rearwardly of the soil roller and have a plurality of horizontally spaced-apart spring teeth secured thereto which extend downwardly therefrom for engagement with the soil.

23 Claims, 5 Drawing Sheets

SOIL GRADING APPARATUS

BACKGROUND OF THE INVENTION

1. Field of the Invention

This invention relates to a soil grading apparatus and more particularly to an apparatus which may be mounted on the front of a skid-steer vehicle or on the three-point point hitch of a tractor to enable soil to be fine graded for subsequent seeding or sodding.

2. Description of the Related Art

Before soil can be seeded or sodded, it is necessary to grade the same so that it is smooth or leveled, the dirt clods are broken up or removed, the rocks are removed, and the soil tilled somewhat to provide a seed or sod bed. Customarily, the soil is graded by means of a blade at either the front or rear of a tractor or the like. Sometimes, a bucket-like scraper or scarifier is used to prepare the soil. All of the prior art methods are less than satisfactory.

SUMMARY OF THE INVENTION

A soil grading apparatus is disclosed which may be mounted on the forward end of a skid-steer vehicle or to the three-point hitch of a tractor. The apparatus includes first and second side frames having a first cross frame secured thereto and extending therebetween which has a mounting means thereon for attachment to the skid-steer vehicle or tractor, with the prime mover capable of at least vertically moving the apparatus. A second cross frame is secured to the first and second side frames and extends therebetween which has a plurality of horizontally spaced-apart, elongated, rigid teeth secured thereto and extending downwardly therefrom for engagement with the soil being graded. A horizontally disposed soil roller is rotatably secured to the first and second side frames adjacent the lower end thereof and extends therebetween. The soil roller has a plurality of small stubs or fingers extending therefrom for engagement with the soil so that the roller will not skid or slide as the apparatus is moved over the soil, but will be rotated. A spring tooth support is secured to the first and second side frames and extends therebetween rearwardly of the soil roller. A plurality of horizontally spaced-apart spring teeth are secured to the spring tooth support and extend downwardly therefrom for engagement with the soil being graded. First and second ground-engaging caster wheels are operatively secured to the first and second side frames, respectively, adjacent the rearward ends thereof.

As the apparatus is moved over the soil being graded, the rigid teeth dig into the soil for approximately two to three inches to till the soil and to cause dirt clods and rocks to be pulled along the soil at the forward ends of the rigid teeth as the apparatus is moved forwardly across the soil. The soil roller and spring teeth also engage the soil to further prepare the soil for seed or sodding. The rigid teeth, soil roller and spring teeth are quickly and easily removed from the side frames to enable replacement or repair thereof.

A principal object of the invention is to provide an improved soil grading apparatus.

A further object of the invention is to provide a soil grading apparatus which breaks up dirt clods, tills the soil, removes dirt clods and rocks, and levels the soil.

A further object of the invention is to provide a soil grading apparatus which may be mounted on either the front end of a skid-steer vehicle or the three-point hitch of a tractor or the like.

Yet another object of the invention is to provide a soil grading apparatus including components thereon which are easily removed for repair and/or replacement.

Still another object of the invention is to provide a soil grading apparatus which is economical of manufacture, durable in use, and refined in appearance.

These and other objects of the invention will be apparent to those skilled in the art.

DESCRIPTION OF THE PREFERRED EMBODIMENT

Figure 1:
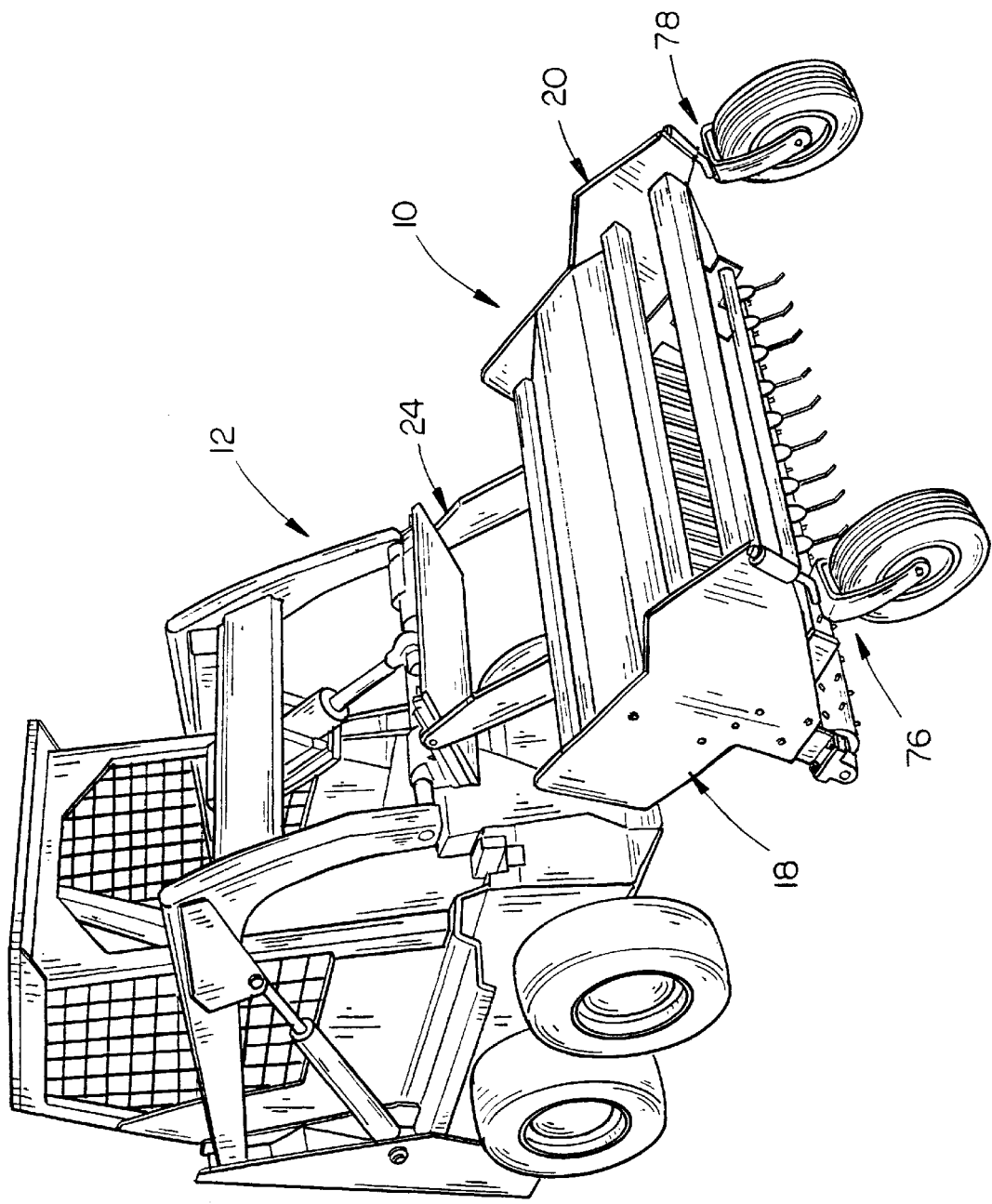
FIG. 1 is a front perspective view of the apparatus of this invention mounted on the front end of a skid-steer vehicle.
Figure 2:
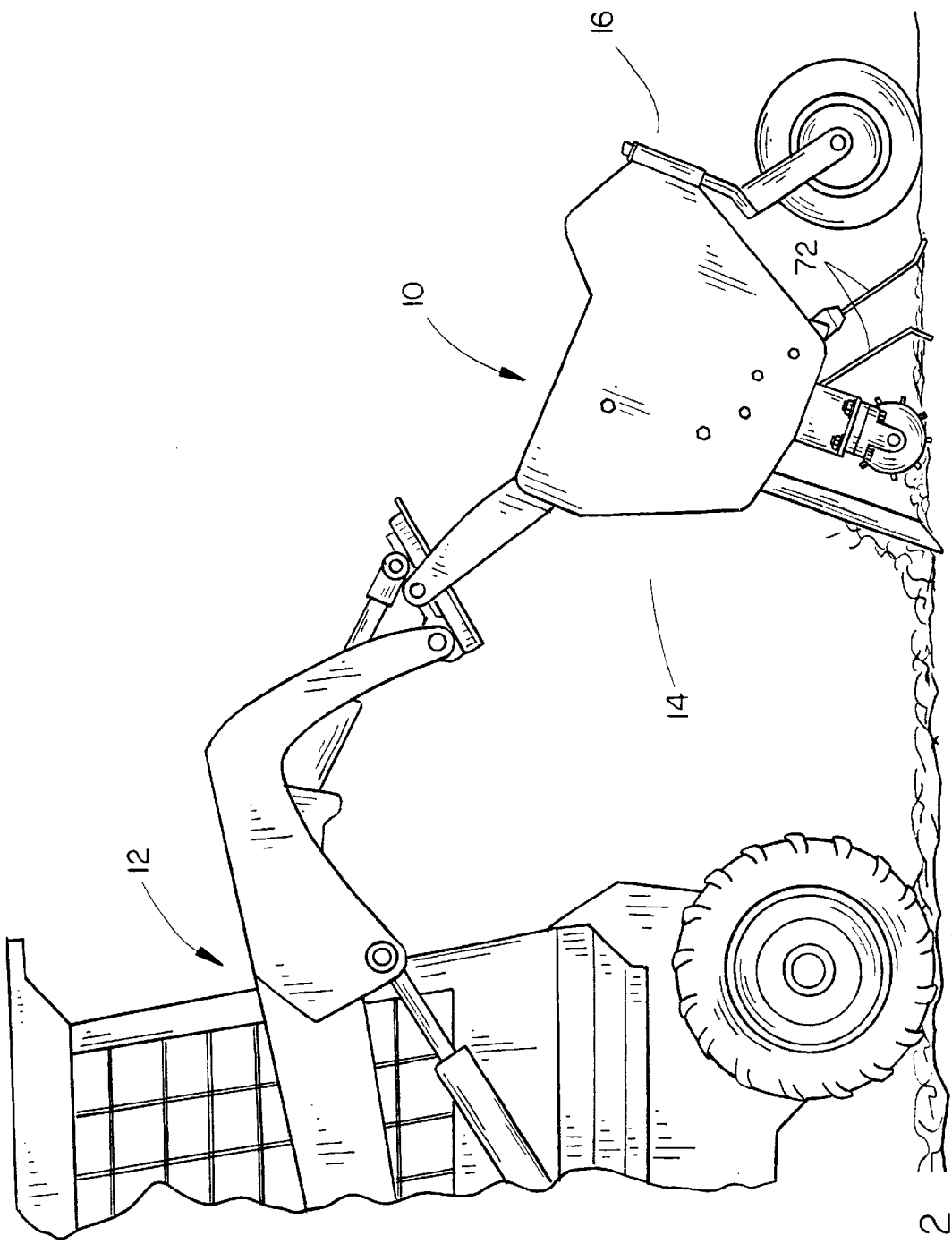
FIG. 2 is a side view of the apparatus being pulled forwardly to the left as viewed in FIG. 2.
Figure 3:
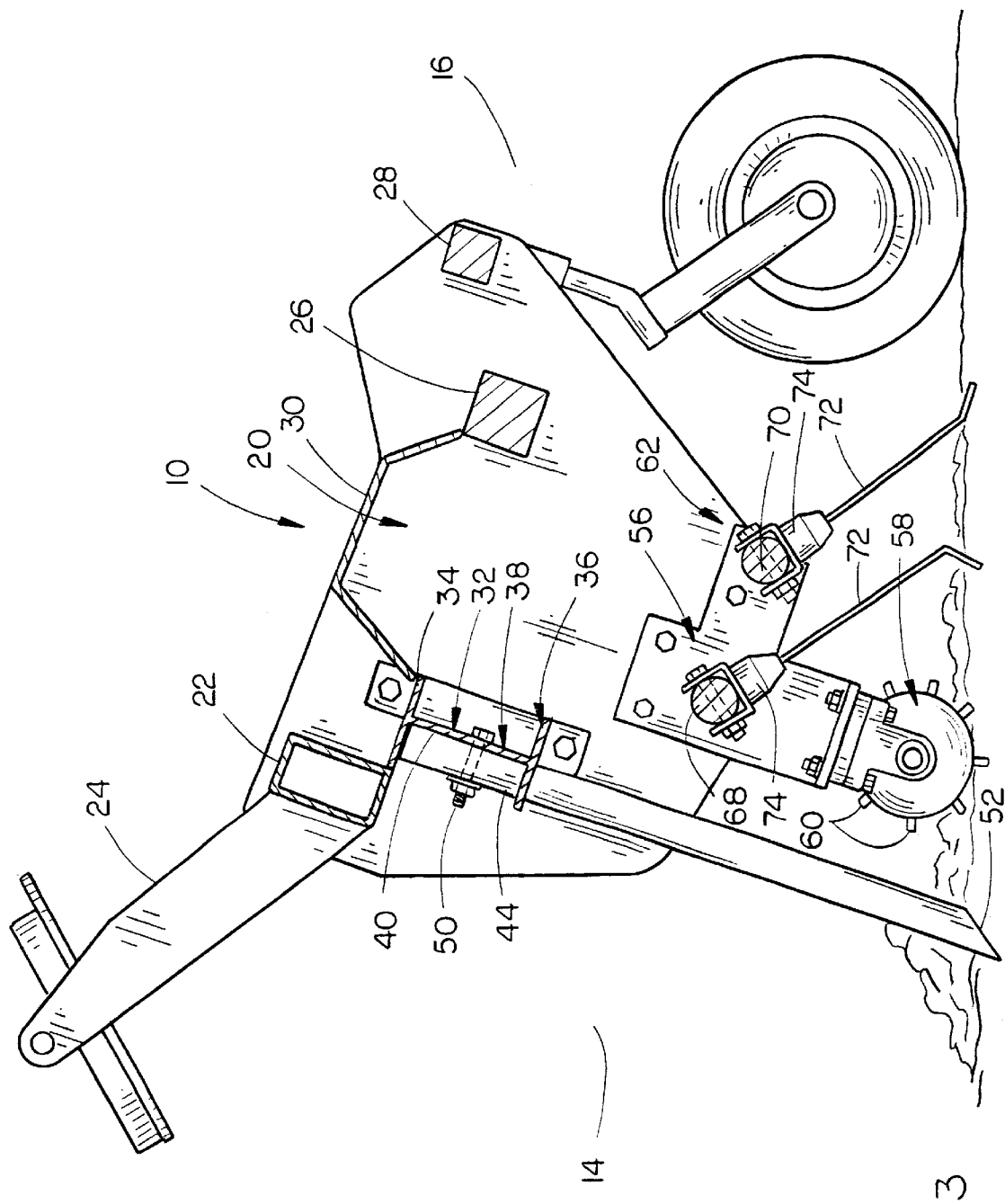
FIG. 3 is a view similar to FIG. 2 except that portions of the apparatus have been cut away to more fully illustrate the invention.
Figure 4:
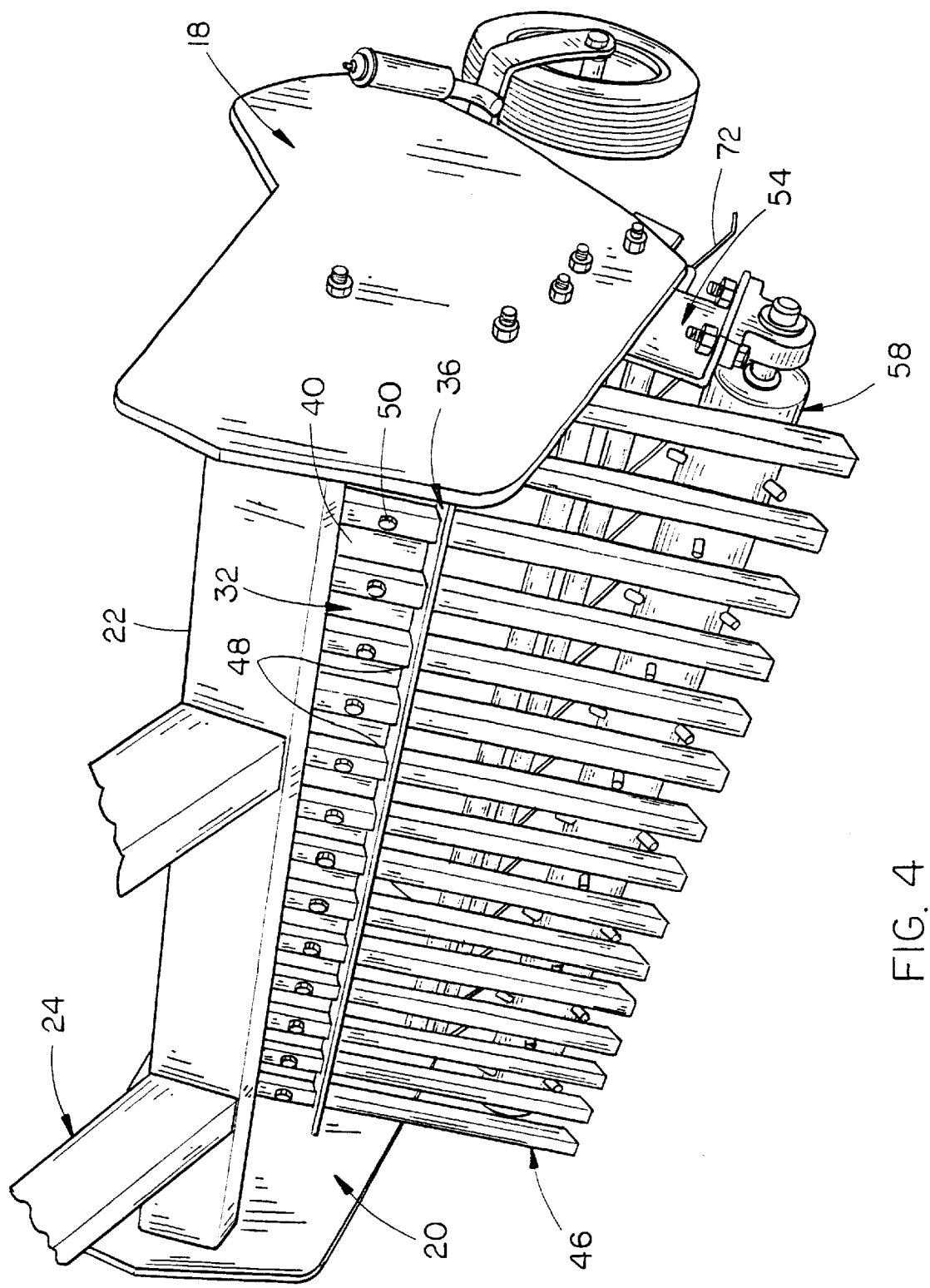
FIG. 4 is a partial front perspective view of the apparatus.
Figure 5:
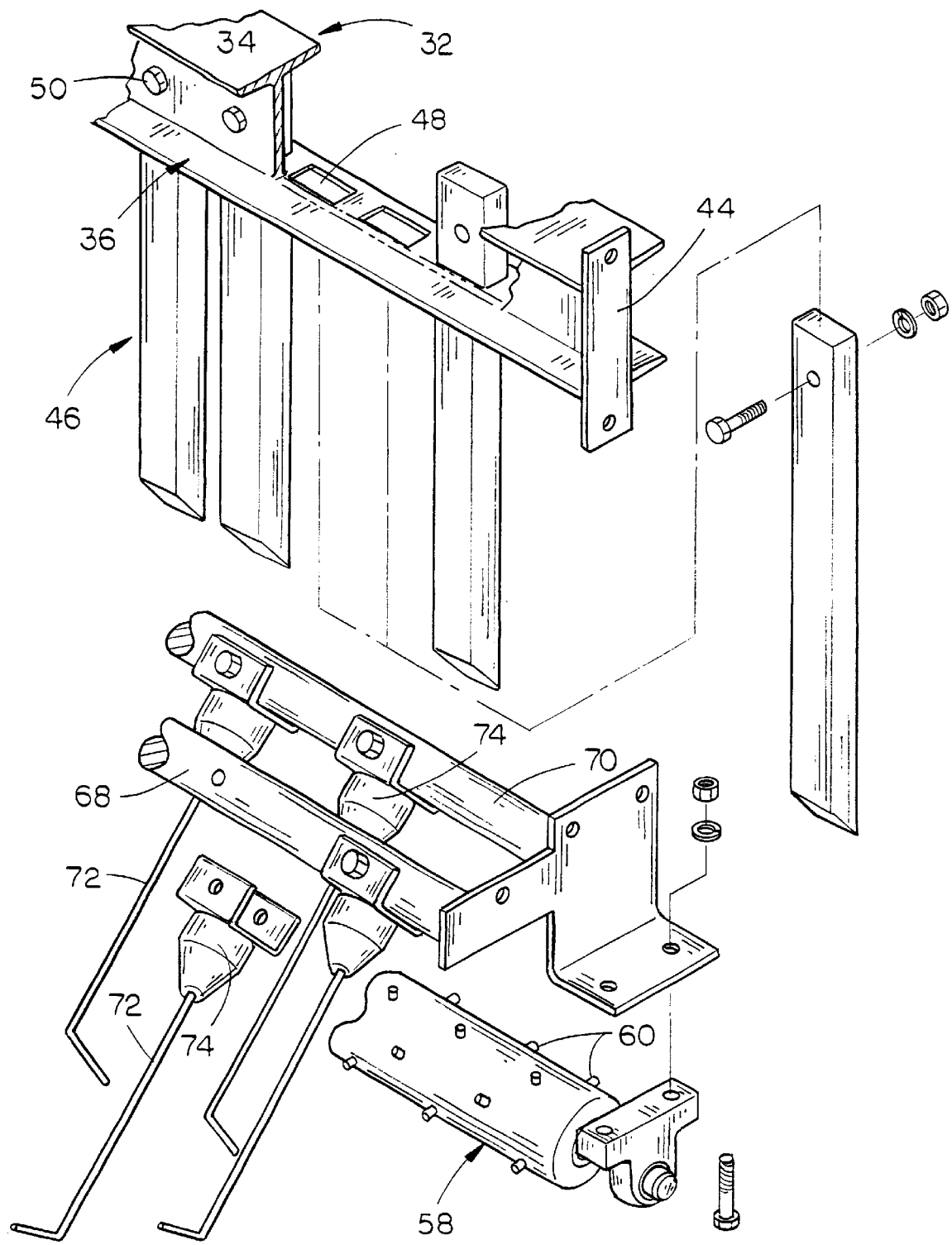
FIG. 5 is a partial exploded perspective view of the apparatus.

The numeral 10 refers to the soil grading apparatus of this invention which is adapted to be secured to the lift arms of a skid-steer vehicle which is generally represented by the reference numeral 12. When the apparatus 10 is mounted oil a skid-steer vehicle 12, the vehicle 12 will be backed over the soil being graded. The apparatus may also be mounted to the three-point hitch of a tractor or the like and in such a case, the tractor will be driven forwardly across the soil being graded, since the three-point hitches of tractors are normally mounted on the rearward ends thereof. For purposes of description, the apparatus 10 will be described as having a forward end 14 and a rearward end 16.

Apparatus 10 includes a pair of side frames 18 and 20 which are vertically disposed and are preferably comprised of a steel material. A first cross frame 22 is welded to the inside surfaces of side frames 18 and 20 and extends therebetween adjacent the forward end thereof, as seen in the drawings. The numeral 24 refers generally to a mounting means which extends forwardly from cross frame 22 for connection to the skid-steer loader or to the three-point hitch of a tractor. Cross frames 26 and 28 are also welded to the inside surfaces of side frames 18 and 20 and extend therebetween at the upper rearward end thereof. The numeral 30 refers to a dust hood which extends between the upper ends of side frames 18 and 20 above the working components of the apparatus.

The numeral 32 refers to a cross frame in the form of an I-beam having a top flange 34, bottom flange 36, and web 38 extending therebetween. For purposes of description, web 38 will be described as having a forward surface 40. Plates 42 and 44 are welded to the outer ends of cross frame 32 with the plates 42 and 44 being removably secured to the inside surface of side frames 18 and 20, respectively, by bolts.

A plurality of elongated, rigid teeth 46 are secured to cross frame 32, as seen in the drawings and as will now be described. The forward end of web 38 is provided with a plurality of spaced-apart openings 48 which receive the upper ends of the teeth 46 with the upper ends of the teeth 46 being positioned adjacent the forward surface 40 of web 38. Each of the upper ends of the teeth 46 are secured to the cross frame 32 by means of a bolt 50 extending through web 38 and through each of the teeth 46. Each of the teeth 46 has a tapered surface 52 provided at the lower end thereof.

Preferably, the teeth 46 are constructed of steel and have a square cross-section.

Mounting plates 54 and 56 are secured to the side frames 18 and 20, respectively, by bolts and are positioned at the inside surfaces thereof and extend downwardly therefrom. An elongated soil roller 58 has its opposite ends rotatably mounted on the lower ends of the plates 54 and 56 so as to be positioned rearwardly of the teeth 46 and above the lower ends of the teeth. To facilitate the roller 58 rolling along the soil rather than skidding or slipping, a plurality of soil engagers 60 in the form of stubs or fingers are secured to the periphery thereof and extend outwardly therefrom. As the apparatus is moved forwardly, with the roller 58 being in ground-engagement, the soil engagers 60 penetrate or dig into the ground to ensure positive rotation of the soil roller 58.

The numeral 62 refers generally to a spring tooth assembly including tubular supports 68 and 70. A plurality of spring teeth 72 are removably bolted to each of the tubular supports 68 and 70 and extend downwardly therefrom for engagement with the soil. Each of the spring teeth 72 includes a resilient mounting means 74 at the upper end thereof which enables the spring teeth 72 to flex in all directions. Tubular support 70 is located or positioned rearwardly of tubular support 68 with the teeth 72 on the tubular support 70 being staggered laterally with respect to the teeth 72 on the tubular support 68. It is preferred that the angled lower end portions of teeth 72 on the tubular support 68 extend laterally in one direction with the angled lower end portions of teeth 72 on the tubular support 70 extending laterally in a direction opposite to the said one direction. Caster wheel assemblies 76 and 78 are mounted on the rearward ends of side frames 18 and 20, respectively.

In operation, apparatus 10 is lowered into ground-engagement as the prime mover, in the form of a skid-steer vehicle or tractor, moves the apparatus forwardly over the soil being graded. If a skid-steer vehicle is being utilized, the vehicle will be backed over the soil being graded. If a tractor is being utilized wherein the three-point hitch is at the rear of the tractor, the tractor will be driven forwardly. The apparatus 10 is lowered until the teeth 46 have penetrated into the ground approximately two to three inches and so that the soil roller 58 is in ground-engagement. Preferably, the apparatus is oriented so that the teeth 46 extend upwardly and rearwardly from their lower ends to their upper ends. As the apparatus 10 is pulled through the soil, the teeth 46 till the soil with soil clods or rocks that are unable to pass between the teeth 46 being pulled forwardly along the forward ends of the teeth 46, with those clods and rocks tending to accumulate upwardly along the lower ends of the teeth. The soil roller 58 tends to break up small dirt clods as it is moved over the soil and also levels or grades the soil. The spring teeth 72 further till the soil to enable the apparatus to fine grade the soil which is necessary to prepare the seed bed or to prepare the soil for sodding. The fact that so many of the components are removably mounted on the apparatus enables the teeth 46 to be individually replaced or to permit the entire cross frame 32 and the teeth thereon to be removed as required. The roller is also quickly and easily removed from the apparatus for repair or replacement as are the tubular supports 68 and 70 and the spring teeth 72.

Thus it can be seen that a novel soil grading apparatus has been provided which accomplishes at least all of its stated objectives.

I claim:

1. A soil grading apparatus, comprising:
   a first side frame having an upper end, a lower end, a forward end, a rearward end, an inner surface, and an outer surface;
   a second side frame having an upper end, a lower end, a forward end, a rearward end, an inner surface, and an outer surface;
   a first cross frame secured to said first and second side frames adjacent the upper forward ends thereof and extending therebetween;
   mounting means on said first cross frame for attachment to a prime mover capable of vertically moving said first cross frame and said first and second side frames;
   a second cross frame secured to said first and second side frames and extending therebetween;
   a plurality of horizontally spaced-apart, elongated, rigid teeth, having upper and lower ends, secured to said second cross frame and extending downwardly therefrom for engagement with the soil being graded;
   a horizontally disposed soil roller rotatably secured to said first and second side frames adjacent the lower ends thereof and extending therebetween;
   a spring tooth support means secured to said first and second side frames and extending therebetween rearwardly of said soil roller;
   a plurality of horizontally spaced-apart spring teeth, having upper and lower ends, secured to said spring tooth support means and extending downwardly therefrom for engagement with the soil being graded;
   first and second ground-engaging caster wheels operatively secured to said first and second side frames, respectively, adjacent the rearward ends thereof.

2. The apparatus of claim 1 wherein said rigid teeth are selectively removably mounted on said second cross frame.

3. The apparatus of claim 1 wherein said rigid teeth are bolted to said second cross frame.

4. The apparatus of claim 1 wherein said rigid teeth extend downwardly and forwardly from said second cross frame.

5. The apparatus of claim 1 wherein said second cross frame is removably secured to said first and second side frames.

6. The apparatus of claim 1 wherein said second cross frame is secured to said first and second side frames rearwardly of said first cross frame.

7. The apparatus of claim 1 wherein said soil roller has a plurality of spaced-apart soil engagers secured thereto and extending therefrom.

8. The apparatus of claim 7 wherein said soil engagers are rigid.

9. The apparatus of claim 1 wherein said soil roller is positioned rearwardly of the lower ends of said rigid teeth.

10. The apparatus of claim 1 wherein each of said rigid teeth has a square cross-section.

11. The apparatus of claim 1 wherein said spring tooth support means comprises first and second tubular members extending between said first and second side frames and wherein said spring teeth are secured to said first and second tubular members.

12. The apparatus of claim 11 wherein each of said spring teeth has a resilient mounting means at its upper end for attachment to said tubular members.

13. The apparatus of claim 11 wherein said second tubular member is positioned rearwardly of said first tubular member.

14. The apparatus of claim 13 wherein the spring teeth of said second tubular member are horizontally staggered with respect to the spring teeth on said first tubular member.

15. The apparatus of claim 1 wherein said soil roller is removably secured to said first and second side frames.

16. The apparatus of claim 1 wherein said spring tooth support means is removably secured to said first and second side frames.

17. A soil grading apparatus, comprising:

a frame means having an upper end, a lower end, a forward end, and a rearward end;

mounting means on said fame means for attachment to a prime mover capable of vertically moving said frame means;

a plurality of horizontally spaced-apart, elongated, rigid teeth, having upper and lower ends, secured to said frame means and extending downwardly therefrom for engagement with the soil being graded;

a horizontally disposed soil roller rotatably secured to said frame means adjacent the lower end thereof;

a spring tooth support means secured to said frame means rearwardly of said soil roller;

a plurality of horizontally spaced-apart spring teeth, having upper and lower ends, secured to said spring tooth support means and extending downwardly therefrom for engagement with the soil being graded;

first and second ground-engaging caster wheels operatively secured to said frame means adjacent the rearward end thereof.

18. The apparatus of claim 17 wherein said rigid teeth are selectively removably mounted on said frame means.

19. The apparatus of claim 17 wherein said rigid teeth extend downwardly and forwardly from said frame means.

20. The apparatus of claim 17 wherein said soil roller has a plurality of spaced-apart soil engagers secured thereto and extending therefrom.

21. The apparatus of claim 17 wherein said soil roller is positioned rearwardly of the lower ends of said rigid teeth.

22. The apparatus of claim 17 wherein said spring tooth support means comprises first and second tubular members and wherein said spring teeth are secured to said first and second tubular members.

23. The apparatus of claim 22 wherein each of said spring teeth has a resilient mounting means at its upper end for attachment to said tubular members.

\* \* \* \* \*